(12) United States Patent
Lin et al.

(10) Patent No.: US 8,898,747 B2
(45) Date of Patent: Nov. 25, 2014

(54) AUTHENTICATION ROUTING SYSTEM AND METHOD FOR CLOUD COMPUTING SERVICE AND AUTHENTICATION ROUTER

(75) Inventors: Zhaoji Lin, Shenzhen (CN); Xiaohua Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 115 days.

(21) Appl. No.: 13/881,225

(22) PCT Filed: Oct. 21, 2011

(86) PCT No.: PCT/CN2011/081136
§ 371 (c)(1),
(2), (4) Date: Apr. 24, 2013

(87) PCT Pub. No.: WO2012/055339
PCT Pub. Date: May 3, 2012

(65) Prior Publication Data
US 2013/0219476 A1    Aug. 22, 2013

(30) Foreign Application Priority Data
Oct. 26, 2010  (CN) .......................... 2010 1 0520650

(51) Int. Cl.
*G06F 7/04*     (2006.01)
(Continued)

(52) U.S. Cl.
CPC ................ *H04L 63/08* (2013.01); *H04L 9/321* (2013.01); *H04L 63/0884* (2013.01);
(Continued)

(58) Field of Classification Search
CPC ... H04L 63/08; H04L 63/205; H04L 63/0884; H04L 67/1097; H04L 67/327; H04L 9/321
USPC ..................................................... 726/4, 24
See application file for complete search history.

(56) References Cited

U.S. PATENT DOCUMENTS

2007/0039053 A1    2/2007   Dvir
2010/0132016 A1    5/2010   Ferris

FOREIGN PATENT DOCUMENTS

CN       1874287 A      12/2006
CN      201491033 U     5/2010
(Continued)

OTHER PUBLICATIONS
International Search Report in international application No. PCT/CN2011/081136, mailed on Jan. 19, 2012.
(Continued)

*Primary Examiner* — Dant Shaifer Harriman
(74) *Attorney, Agent, or Firm* — Oppedahl Patent Law Firm LLC

(57) ABSTRACT

The disclosure discloses an authentication routing system and method for a cloud computing service and an authentication router. The method comprises the following steps: an authentication router registers a cloud computing service and saves the registration information of a cloud computing service registered successfully, wherein the registration information includes but is not limited to: an index number of a cloud computing service, an authentication mechanism chosen by the cloud computing service, an address of an authentication server address providing the authentication mechanism and a routing strategy of the authentication server; when a user terminal requests a cloud computing service, the authentication router receives an authentication request for the user terminal from the requested cloud computing service; and the authentication router routes the authentication request for the user terminal to a corresponding authentication server for authentication according to the saved registration information corresponding to the cloud computing service. Through the disclosure, a cloud computing service can provide a consistent user authentication experience and a relatively high authentication security level and effectively ensures the privacy security of the user when being used by the user.

15 Claims, 4 Drawing Sheets

(51) Int. Cl.
*G06F 15/16* (2006.01)
*G06F 17/30* (2006.01)
*H04L 29/06* (2006.01)
*H04L 9/32* (2006.01)
*H04L 29/08* (2006.01)

(52) U.S. Cl.
CPC .......... *H04L 67/1097* (2013.01); *H04L 67/327* (2013.01); *H04L 63/205* (2013.01)
USPC ............................................................ 726/4

(56) References Cited

FOREIGN PATENT DOCUMENTS

| | | |
|---|---|---|
| CN | 101719829 A | 6/2010 |
| CN | 101834846 A | 9/2010 |
| WO | 2007015254 A2 | 2/2007 |

OTHER PUBLICATIONS

English Translation of the Written Opinion of the International Search Authority in international application No. PCT/CN2011/081136, mailed on Jan. 19, 2012.

AUTHENTICATION ROUTING SYSTEM AND METHOD FOR CLOUD COMPUTING SERVICE AND AUTHENTICATION ROUTER

TECHNICAL FIELD

The disclosure relates to the technical field of cloud computing, in particular to an authentication routing system and method for a cloud computing service and an authentication router.

BACKGROUND

The cloud computing is becoming an increasing concern along with the rapid development of computer technology, and gains much attention no matter from the internet manufacturers or operators, the communication manufacturers or the basic network operators.

In a narrow sense, the cloud computing refers to a delivery and using mode of an Internet Technology (IT) infrastructure to acquire required resources by a network in an on-demand and easily-extensible way; and in a broad sense, the cloud computing refers to a delivery and using mode of a service to acquire required resources by a network in an on-demand and easily-extensible way. This service can be one related to IT, software and internet, or any other service; and the cloud computing has the advantages of super-large scale, virtualization, reliability and security and the like. The cloud computing can reduce the operating cost and maintenance cost greatly for a network operator to achieve the aim of energy conservation and emission reduction; and in addition, the cloud computing can further expand the operating range so as not to be only limited to pipeline operation. In a cloud computing environment, all resources are operable and can be provided as a service, including application, software, platform, processing capacity, storage, network, computing resources, other infrastructures and the like. Users can consume at any place and any time due to the cloud computing, and can further acquire the IT resources required by an operation service without a heavy investment and rent the resources completely according to their requirements. The IT resources are acquired and charged on demand like water, power and gas.

The cloud computing mainly has three service modes: Infrastructure as a Service (Iaas), Platform as a Service (PaaS) and Software as a Servcie (SaaS).

In a cloud computing scenario, a lot of user information is concentrated in a cloud computing provider, and the cloud computing is more concentrated in information and higher in information asset value and faces more attacks than a conventional internet service, which requires that the cloud computing service provider should have a more powerful user authentication mechanism to ensure that only a valid user can access the authorized resources.

The conventional solution for this is that: each cloud computing service provider has its own user authentication system, which is generally called a local authentication server, such as a Lightweight Directory Access Protocol (LDAP) directory server or an Authentication Authorization Accounting (AAA) server, which is used for authenticating user access to a cloud computing service. The method has the following defects: the cloud computing generally has a great number of users, so as to result in great increase in the authentication overhead of the cloud computing service providers; a user needs to be registered in different cloud computing service providers, so that the user experience is poor and the risk of privacy leakage increases; and in addition, different cloud computing service providers have different authentication solutions and different security levels, and according to the cask principle, once an authentication system of a cloud computing service provider with the lowest security level is compromised, the user authentications of other cloud computing service providers are very likely to be under threat, this is because general users always utilize the same or similar authentication credential in order to remember it easily.

SUMMARY

In view of this, the main objective of the disclosure is to provide an authentication routing system and method for a cloud computing service and an authentication router, in order to ensure that a consistent user authentication experience and a relatively high authentication security level can be provided for different user terminals and different network access ways and the privacy security of a user can be effectively ensured when a cloud computing service is used by the user.

To achieve the objective above, the technical scheme of the disclosure is implemented as follows.

The disclosure provides an authentication routing system for a cloud computing service, which includes a user terminal, an authentication router and an authentication server, wherein the authentication router is configured to register a cloud computing service and save the registration information of a cloud computing service registered successfully, and further configured to receive an authentication request for the user terminal from the cloud computing service, and route the authentication request for the user terminal to a corresponding authentication server according to the saved registration information corresponding to the cloud computing service;

the user terminal is configured to request and use a cloud computing service; and the authentication server is configured to authenticate the user terminal according to its own authentication mechanism.

The registration information may include: an index number of a cloud computing service, an authentication mechanism chosen by the cloud computing service, an address of an authentication server address providing the authentication mechanism and a routing strategy of the authentication server.

The authentication router further may include a registration module which is configured to receive a registration request from the cloud computing service, provide an optional authentication mechanism list to the cloud computing service which is requested to be registered, and receive an authentication mechanism chosen by the cloud computing service from the list, and save the registration information of the cloud computing service according to the authentication mechanism chosen by the cloud computing service.

The authentication request for the user terminal from the cloud computing service may at least carry the index number of the cloud computing service; and correspondingly, the authentication router further may include an authentication routing module which is configured to choose an authentication mechanism for the cloud computing service according to a predetermined strategy and the index number of the cloud computing service carried in the authentication request, and search for a corresponding authentication server address in the registration information according to the chosen authentication mechanism to route the authentication request to the corresponding authentication server.

The authentication server may be further configured to, if the user terminal does not support the authentication mechanism of the authentication server when being authenticated by the authentication server, notify the authentication router of this situation; and correspondingly, the authentication routing module of the authentication router is further configured to choose another authentication mechanism for the cloud computing service according to the predetermined strategy when the authentication server notifies that the user terminal does not support the chosen authentication mechanism, and search for a corresponding authentication server address in the registration information according to the chosen authentication mechanism to route the authentication request to the corresponding authentication server for authentication.

The authentication server may be further configured to return an authentication result to the authentication router after completing the authentication for the user terminal; and the authentication router returns the authentication result to the cloud computing service, and the cloud computing service determines whether to provide the user terminal with the cloud computing service according to the authentication result received.

The disclosure further provides an authentication routing method for the cloud computing service, which includes the following steps:

an authentication router registers a cloud computing service and saves registration information of a cloud computing service registered successfully;

when a user terminal requests a cloud computing service, the authentication router receives an authentication request for the user terminal from the requested cloud computing service; and the authentication router routes the authentication request for the user terminal to a corresponding authentication server for authentication according to the saved registration information corresponding to the cloud computing service.

The registration information may include: an index number of a cloud computing service, an authentication mechanism chosen by the cloud computing service, an address of an authentication server address providing the authentication mechanism and a routing strategy of the authentication server.

The step that an authentication router registers a cloud computing service and saves the registration information may include:

the authentication router receives a registration request from the cloud computing service;

the authentication router provides an optional authentication mechanism list to the cloud computing service which is requested to be registered;

the cloud computing service chooses a proper authentication mechanism from the optional authentication mechanism list according to a security requirement and strategy and returns the proper authentication mechanism to the authentication router; and the authentication router saves the registration information of the cloud computing service according to the authentication mechanism chosen by the cloud computing service.

The authentication request for the user terminal from the cloud computing service may at least carry the index number of the cloud computing service; and the authentication router chooses an authentication mechanism for the cloud computing service according to a predetermined strategy and the index number of the cloud computing service carried in the authentication request, and searches for a corresponding authentication server address in the registration information according to the chosen authentication mechanism to route the authentication request to the corresponding authentication server.

The method further may include:

if the user terminal does not support the authentication mechanism of the authentication server when being authenticated by the authentication server, the authentication server notifies the authentication router of this situation; and the authentication router chooses another authentication mechanism for the cloud computing service according to the predetermined strategy, and searches for a corresponding authentication server address in the registration information according to the chosen authentication mechanism to route the authentication request to the corresponding authentication server for authentication.

The method further may include:

the authentication server returns an authentication result to the authentication router after completing the authentication for the user terminal;

the authentication router returns an authentication result to the cloud computing service; and the cloud computing service determines whether to provide the user terminal with the cloud computing service according to the authentication result received.

The disclosure further provides an authentication router, which includes:

a registration module, which is configured to register a cloud computing service and save the registration information of a cloud computing service registered successfully; and an authentication routing module, which is configured to receive an authentication request for a user terminal from the cloud computing service, and route the authentication request for the user terminal to a corresponding authentication server for authentication according to the saved registration information corresponding to the cloud computing service.

The registration information may include: an index number of a cloud computing service, an authentication mechanism chosen by the cloud computing service, an address of an authentication server address providing the authentication mechanism and a routing strategy of the authentication server.

The registration module may be further configured to receive a registration request from the cloud computing service, provide an optional authentication mechanism list to the cloud computing service which is requested to be registered, further receive an authentication mechanism chosen by the cloud computing service from the list, and save the registration information of the cloud computing service according to the authentication mechanism chosen by the cloud computing service.

The authentication request for the user terminal from the cloud computing service may at least carry the index number of the cloud computing service; and correspondingly, the authentication routing module may be further configured to choose an authentication mechanism for the cloud computing service according to a predetermined strategy and the index number of the cloud computing service carried in the authentication request, and search for a corresponding authentication server address in the registration information according to the chosen authentication mechanism to route the authentication request to the corresponding authentication server.

The authentication routing module may be further configured to choose another authentication mechanism for the cloud computing service according to the predetermined strategy when the authentication server notifies that the user terminal does not support the chosen authentication mechanism, and search for a corresponding authentication server address in the registration information according to the chosen authentication mechanism to route the authentication request to the corresponding authentication server for authentication.

The authentication routing module may be further configured to forward an authentication result returned by the authentication server to the cloud computing service after the authentication server completes the authentication for the user terminal.

According to the authentication routing system and method for a cloud computing service and the authentication router provided by the disclosure, a cloud computing service provider, with a cloud computing service authentication router, can provide access authentication for a user with the assistance of other more professional authentication infrastructures, so that the authentication overhead of the cloud computing service provider is reduced, the authentication is separated from service authorization, the privacy of the user is protected, and the problem of invalid authentication single point caused by a large number of users accessing the cloud computing service provider is reduced. Therefore, the cloud computing service is more reliable and credible.

DETAILED DESCRIPTION

The technical scheme of the disclosure is further explained below with reference to the drawings and embodiments in detail.

Figure 1:
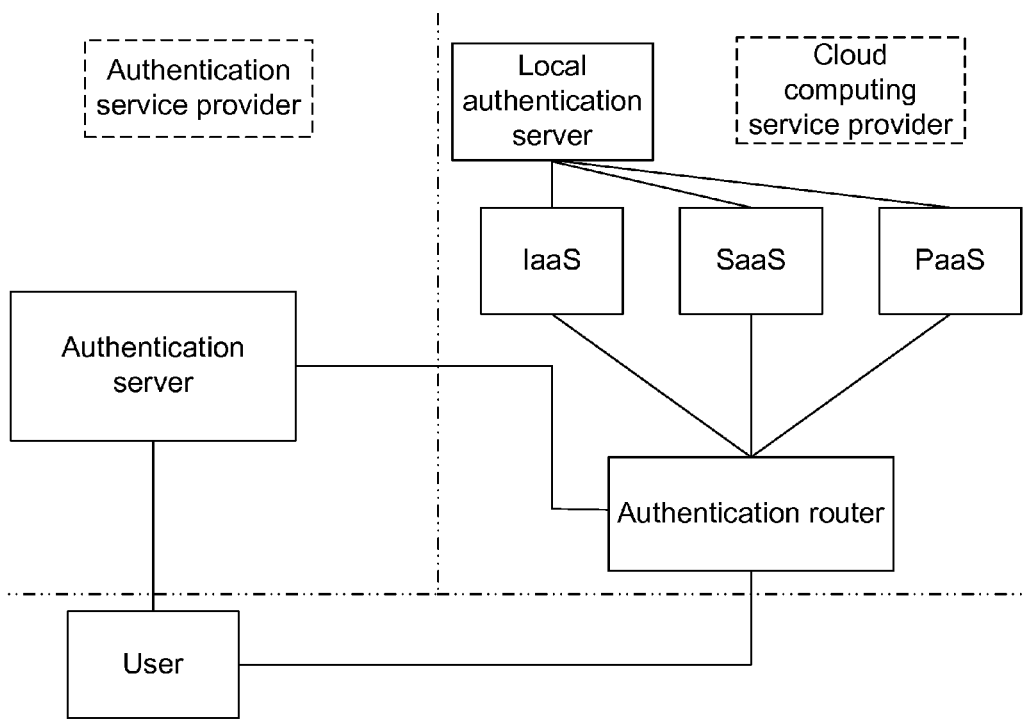
FIG. 1 is a diagram showing the structure of an authentication routing system for a cloud computing service in one embodiment of the disclosure.

A unified authentication framework for a cloud computing service provided by the disclosure is as shown in FIG. 1, the framework can be divided into three domains: an authentication service provider domain, a cloud computing service provider domain and a user terminal domain. The authentication service provider domain is responsible for providing a professional authentication for a user accessing a cloud computing service, with the main function completed by an authentication server, and can be formed by an authentication infrastructure of a network provider, such as related authentication network elements in a 3rd Generation Partnership Project (3GPP) network, or a Home Subscriber Server (HSS)/an Authentication Center (AuC), or a Home Location Register (HLR)/AuC, and a Bootstrapping Service Function (BSF) or an AAA server in a fixed network, or a pure identity provider; in the cloud computing service provider domain, the functional entities related to the authentication include a local authentication server and an authentication router, wherein the local authentication server is responsible for the identity authentication of a local user, and the authentication router is responsible for the management and maintenance of authentication information of a cloud computing service, and the routing of the authentication server; and the user terminal domain mainly includes a user terminal, which is responsible for authentication request and service consumption.

Figure 2:
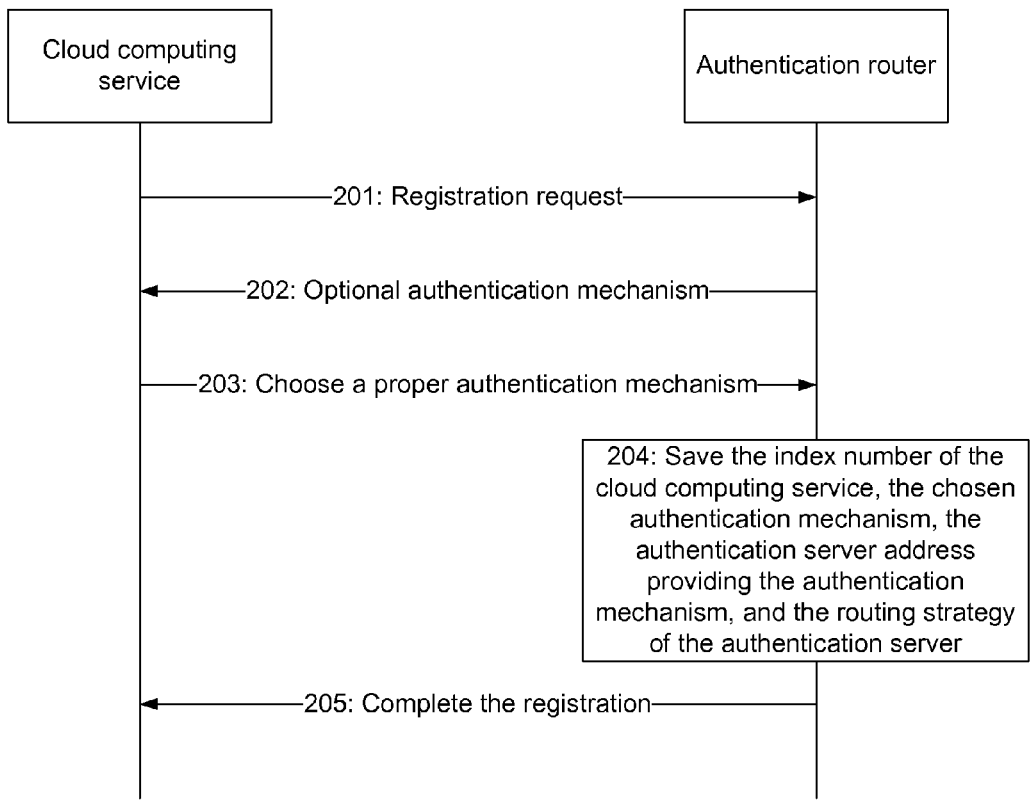
FIG. 2 is a flowchart showing the registration of a cloud computing service in an authentication router in one embodiment of the disclosure.

In the cloud computing service provider domain, a user terminal may need authentication mechanisms at different security levels to access various cloud computing services and the authentication mechanism required by the cloud computing service needs to be preset in the authentication router in advance; the authentication router is an authentication boundary entrance functional entity when the user terminal accesses the cloud computing service; and the cloud computing service is registered in the authentication router by a series of specified registration processes and a standard authentication registration interface. The registration process is as shown in FIG. 2, specifically including the following steps.

Step 201: A cloud computing service requests an authentication router for registration.

Step 202: The authentication router provides the cloud computing service with an optional authentication mechanism.

The authentication service providing these authentication mechanisms can be provided by an authentication service provider who is approved by a cloud computing provider and has established a trust relationship with the cloud computing service provider in advance. Common authentication mechanisms include: authentication based on a Subscriber Identity Module (SIM), authentication based on a Universal Integrated Circuit Card (UICC), authentication based on a user name password, authentication based on a certificate and the like.

Step 203: A proper authentication mechanism (various authentication mechanisms can be chosen) is chosen from an authentication mechanism list provided by the authentication router according to the security requirement and strategy of the cloud computing service.

Step 204: The authentication router saves the index number of the cloud computing service, the chosen authentication mechanism, the address of the authentication server providing the authentication mechanism (such as the Uniform Resource Locator (URL) of the authentication server), the routing strategy of the authentication server and other information according to the choice made by the cloud computing service.

Step 205: The authentication router returns a registration success message to the cloud computing service.

Figure 3:
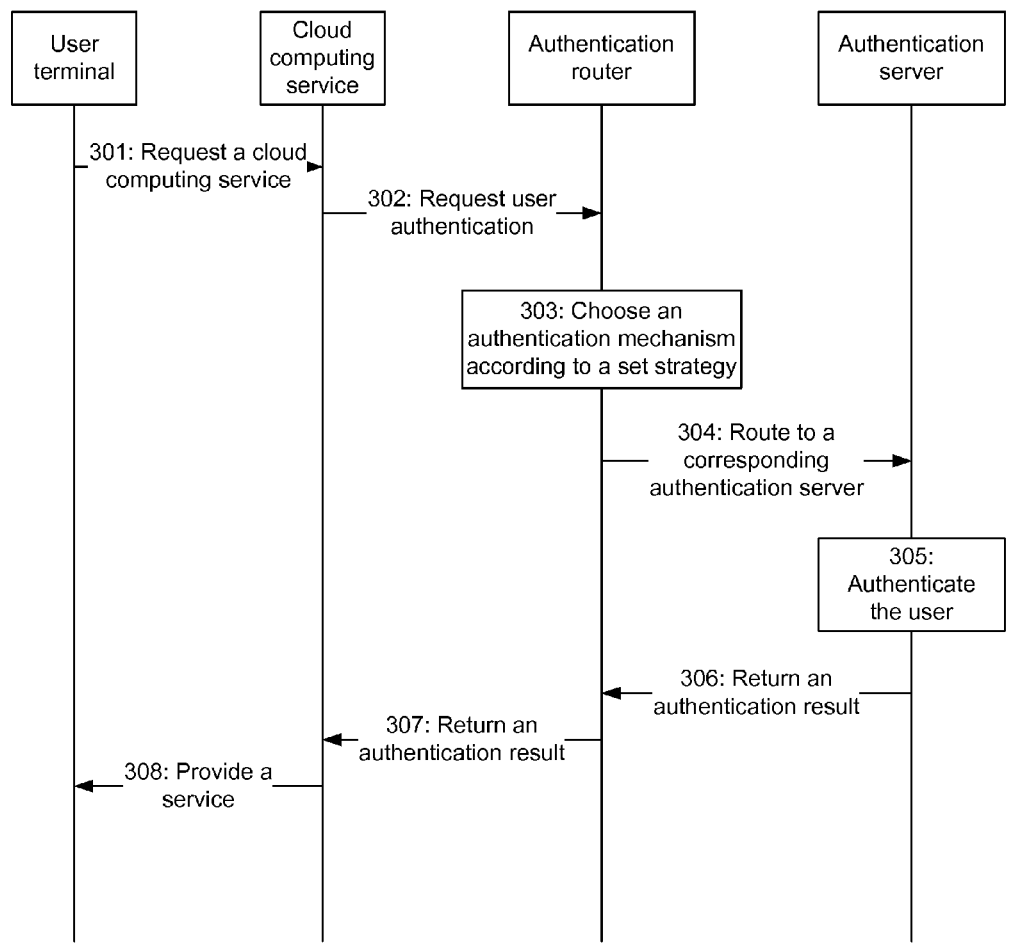
FIG. 3 is a flowchart showing the authentication for a user requesting a cloud computing service in one embodiment of the disclosure.

Once a certain cloud computing service is completely registered in the authentication router, the authentication for a terminal user accessing the cloud computing service is routed to a corresponding authentication server according to a predetermined strategy, and the authentication server completes the authentication for the user. If the cloud computing service is not registered in the authentication router, a local authentication server can complete the authentication for the user by default or the user directly accesses the service without being authenticated; and theses interfaces can be set in the strategy of the authentication router. FIG. 3 shows the complete processes of the authentication for a user terminal accessing a cloud computing service, specifically including the following steps.

Step 301: A user terminal requests a cloud computing service, which can be an SaaS, a PaaS or an IaaS.

Step 302: The cloud computing service requests an authentication router to authenticate the request of the user terminal, wherein the request message at least carries the index number of the cloud computing service.

Step 303: The authentication router chooses an authentication mechanism for the cloud computing service according to a predetermined strategy and the index number of the computing service. The predetermined strategy can be: choosing the authentication mechanism from high security level to low security level, choosing the authentication mechanism from low complexity to high complexity, and the like.

Step 304: The authentication request is routed to a corresponding authentication server according to the address of a chosen authentication server corresponding to the authentication mechanism.

Step 305: The authentication server authenticates the terminal user using the chosen authentication mechanism.

It should be noted that Step 303 is executed again to repeat the processes above if the terminal user does not support the authentication mechanism till the authentication request is routed to a proper authentication server. The authentication router can set a routing strategy according to the requirement of the cloud computing service to meet the requirements on time delay, protocol overhead, or authentication security level and the like in the whole authentication process.

Step 306: The authentication server returns an authentication result to the authentication router if it completes the authentication for the terminal user.

Step 307: The authentication router returns an authentication result to the cloud computing service.

Step 308: The cloud computing service determines whether to provide the terminal user with the service according to the received authentication result.

It should be noted that the authentication server in the processes above can be either a local authentication server or a non-local authentication server of a cloud computing service provider; and the cloud computing service provider can provide an interface for an authentication service provider to establish a trust relationship with it, and add the interface to the authentication router of the cloud computing service provider.

Figure 4:
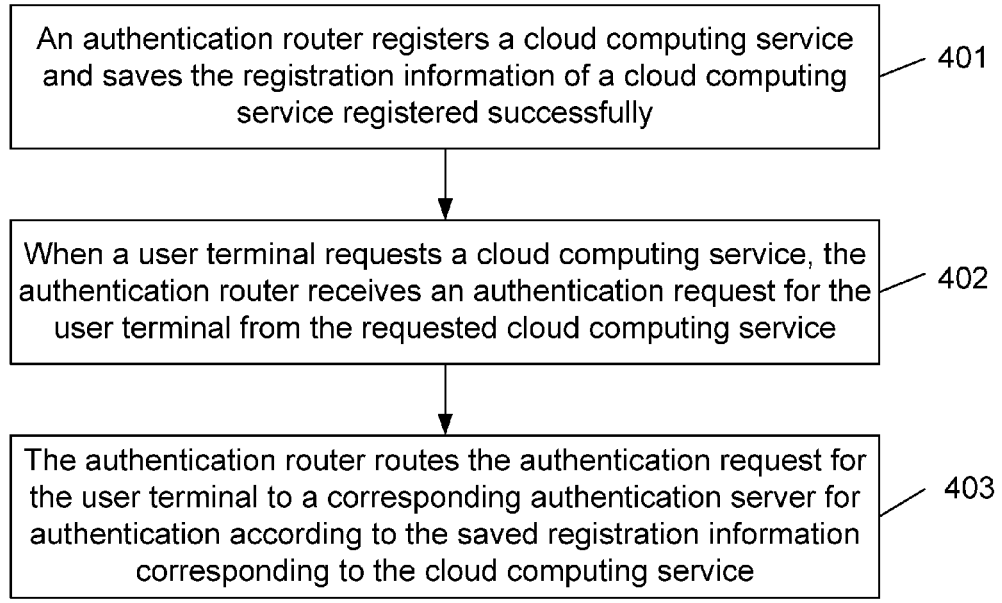
FIG. 4 is a flowchart of an authentication routing method for a cloud computing service in one embodiment of the disclosure.

In combination with what described in the technical scheme above, it can be seen that the authentication routing technology of a cloud computing service of the disclosure contains the operation thought shown in FIG. 4. As shown in FIG. 4, which is a flowchart of an authentication routing method for a cloud computing service in one embodiment of the disclosure, the processes mainly include the following steps.

Step 401: An authentication router registers a cloud computing service and saves registration information of a cloud computing service registered successfully.

The registration information at least includes: an index number of a cloud computing service, and the address of an authentication server providing an authentication mechanism; and the registration information can further include: an authentication mechanism chosen by the cloud computing service, and a routing strategy of an authentication server. The registration information is not limited to the above and can be expanded according to an actual requirement.

Specifically, the authentication router receives a registration request from the cloud computing service and provides an optional authentication mechanism list for the cloud computing service which is requested to be registered; the cloud computing service chooses a proper authentication mechanism from the optional authentication mechanism list according to the security requirement and strategy and returns it to the authentication router; and the authentication router saves the registration information of the cloud computing service according to the authentication mechanism chosen by the cloud computing service.

Step 402: When a user terminal requests a cloud computing service, the authentication router receives an authentication request for the user terminal from the requested cloud computing service.

The authentication request for the user terminal from the cloud computing service at least carries the index number of the cloud computing service; and the authentication router chooses an authentication mechanism for the cloud computing service according to a predetermined strategy and the index number of the cloud computing service carried in the authentication request, and searches for a corresponding authentication server address in the registration information according to the chosen authentication mechanism to route the authentication request to the corresponding authentication server.

Step 403: The authentication router routes the authentication request for the user terminal to a corresponding authentication server for authentication according to the saved registration information corresponding to the cloud computing service.

If the user terminal does not support the authentication mechanism of the authentication server when being authenticated by the authentication server, the authentication server notifies the authentication router of this situation; and the authentication router chooses another authentication mechanism for the cloud computing service according to the predetermined strategy, and searches for a corresponding authentication server address in the registration information according to the chosen authentication mechanism to route the authentication request to the corresponding authentication server for authentication.

In addition, the authentication server returns an authentication result to the authentication router after completing the authentication for the user terminal; the authentication router returns an authentication result to the cloud computing service; and the cloud computing service determines whether to provide the user terminal with the cloud computing service according to the received authentication result.

Figure 5:
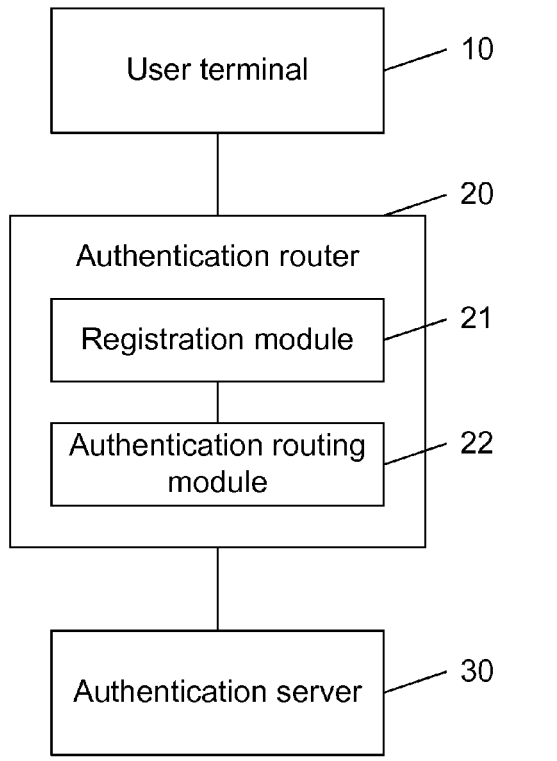
FIG. 5 is a diagram showing the composition structure of an authentication routing system for a cloud computing service in one embodiment of the disclosure.

Corresponding to the authentication routing method for a cloud computing service above, a authentication routing system for a cloud computing service provided by the disclosure, as shown in FIG. 5, includes a user terminal 10, an authentication router 20 and an authentication server 30. The authentication router 20 is configured to register a cloud computing service and save the following registration information of a cloud computing service registered successfully: an index number of a cloud computing service, an authentication mechanism chosen by the cloud computing service, the address of an authentication server providing the authentication mechanism and a routing strategy of the authentication server. The user terminal 10 is configured to request and use a cloud computing service; and the authentication router 20 is further configured to receive an authentication request for the user terminal 10 from the cloud computing service, and route the authentication request for the user terminal 10 to a corresponding authentication server 30 according to the saved registration information corresponding to the cloud computing service. The authentication server 30 is configured to authenticate the user terminal 10 according to its own authentication mechanism.

The authentication router 20 further includes a registration module 21 and an authentication routing module 22. The registration module 21 is configured to register a cloud computing service and saves registration information of a cloud computing service registered successfully. Specifically: the registration module is configured to receive a registration request from the cloud computing service, provide an optional authentication mechanism list for the cloud computing service which is requested to be registered, further receive the authentication mechanism chosen by the cloud computing service from the list, and save the registration information of the cloud computing service according to the authentication mechanism chosen by the cloud computing service. The authentication routing module 22 is configured to receive an authentication request for a user terminal 10 from the cloud computing service, and route the authentication request for the user terminal 10 to a corresponding authentication server for authentication according to the saved registration information corresponding to the cloud computing service.

Furthermore, the authentication request for the user terminal 10 from the cloud computing service at least carries the index number of the cloud computing service; and correspondingly, the authentication routing module 20 is further configured to choose an authentication mechanism for the cloud computing service according to the predetermined strategy and the index number of the cloud computing service carried in the authentication request, and search for a corresponding authentication server address in the registration information according to the chosen authentication mechanism to route the authentication request to the corresponding authentication server 30.

Furthermore, the authentication routing module 20 is further configured to choose another authentication mechanism for the cloud computing service according to the predetermined strategy when the authentication server 30 notifies that the user terminal 10 does not support the chosen authentication mechanism, and search for a corresponding authentication server address in the registration information according to the chosen authentication mechanism to route the authentication request to the corresponding authentication server 30 for re-authentication.

Furthermore, the authentication routing module 20 is further configured to forward the authentication result returned by the authentication server to the cloud computing service after the authentication server 30 completes the authentication for the user terminal 10.

To sum up, according to the disclosure, a cloud computing service provider, with a cloud computing service authentication router arranged therein, can provide an access authentication for a user by other more professional authentication infrastructures, so that the authentication overhead of the cloud computing service provider is reduced, the authentication is separated from service authorization, the privacy of the user is protected, and the problem of invalid authentication single point caused by a large number of users accessing the cloud computing service provider is reduced. Therefore, the cloud computing service is more reliable and credible.

What described above are only preferred embodiments of the disclosure, and not intended to limit the scope of protection of the disclosure.

The invention claimed is:

1. An authentication routing system for a cloud computing service, comprising: a user terminal, an authentication router and an authentication server, wherein
the authentication router is configured to register a cloud computing service and save registration information of a cloud computing service registered successfully, and further configured to receive an authentication request for the user terminal from the cloud computing service, and route the authentication request for the user terminal to a corresponding authentication server according to the saved registration information corresponding to the cloud computing service;
the user terminal is configured to request and use a cloud computing service;
the authentication server is configured to authenticate the user terminal according to its own authentication mechanism; and
wherein the registration information comprises: an index number of a cloud computing service, an authentication mechanism chosen by the cloud computing service, an address of an authentication server address providing the authentication mechanism and a routing strategy of the authentication server.

2. The authentication routing system for a cloud computing service according to claim 1, wherein the authentication router further comprises a registration module which is configured to receive a registration request from the cloud computing service, provide an optional authentication mechanism list to the cloud computing service which is requested to be registered, and receive an authentication mechanism chosen by the cloud computing service from the list, and save the registration information of the cloud computing service according to the authentication mechanism chosen by the cloud computing service.

3. The authentication routing system for a cloud computing service according to claim 1, wherein the authentication request for the user terminal from the cloud computing service at least carries the index number of the cloud computing service; and
correspondingly, the authentication router further comprises an authentication routing module which is configured to choose an authentication mechanism for the cloud computing service according to a predetermined strategy and the index number of the cloud computing service carried in the authentication request, and search for a corresponding authentication server address in the registration information according to the chosen authentication mechanism to route the authentication request to the corresponding authentication server.

4. The authentication routing system for a cloud computing service according to claim 3, wherein the authentication server is further configured to, if the user terminal does not support the authentication mechanism of the authentication server when being authenticated by the authentication server, notify the authentication router of this situation; and
correspondingly, the authentication routing module of the authentication router is further configured to choose another authentication mechanism for the cloud computing service according to the predetermined strategy when the authentication server notifies that the user terminal does not support the chosen authentication mechanism, and search for a corresponding authentication server address in the registration information according to the chosen authentication mechanism to route the authentication request to the corresponding authentication server for authentication.

5. The authentication routing system for a cloud computing service according to claim 1, wherein the authentication server is further configured to return an authentication result to the authentication router after completing the authentication for the user terminal; and
the authentication router returns an authentication result to the cloud computing service, and the cloud computing service determines whether to provide the user terminal with the cloud computing service according to the authentication result received.

6. An authentication routing method for a cloud computing service, comprising:
- registering, by an authentication router, a cloud computing service and saving registration information of a cloud computing service registered successfully;
- when a user terminal requests a cloud computing service, receiving, by the authentication router, an authentication request for the user terminal from the requested cloud computing service;
- routing, by the authentication router, the authentication request for the user terminal to a corresponding authentication server for authentication according to the saved registration information corresponding to the cloud computing service; and
- wherein the registration information comprises: an index number of a cloud computing service, an authentication mechanism chosen by the cloud computing service, an address of an authentication server address providing the authentication mechanism and a routing strategy of the authentication server.

7. The authentication routing method for a cloud computing service according to claim 6, wherein the registering, by an authentication router, a cloud computing service and saving registration information comprises:
- receiving, by the authentication router, a registration request from the cloud computing service;
- providing, by the authentication router, an optional authentication mechanism list to the cloud computing service which is requested to be registered;
- choosing, by the cloud computing service, a proper authentication mechanism from the optional authentication mechanism list according to a security requirement and strategy and returning the proper authentication mechanism to the authentication router; and
- saving, by the authentication router, the registration information of the cloud computing service according to the authentication mechanism chosen by the cloud computing service.

8. The authentication routing method for a cloud computing service according to claim 6, wherein the authentication request for the user terminal from the cloud computing service at least carries the index number of the cloud computing service; and
- the authentication router chooses an authentication mechanism for the cloud computing service according to a predetermined strategy and the index number of the cloud computing service carried in the authentication request, and searches for a corresponding authentication server address in the registration information according to the chosen authentication mechanism to route the authentication request to the corresponding authentication server.

9. The authentication routing method for a cloud computing service according to claim 8, further comprising:
- if the user terminal does not support the authentication mechanism of the authentication server when being authenticated by the authentication server, notifying, by the authentication server, the authentication router of this situation; and
- choosing, by the authentication router, another authentication mechanism for the cloud computing service according to the predetermined strategy, and searching for a corresponding authentication server address in the registration information according to the chosen authentication mechanism to route the authentication request to the corresponding authentication server for authentication.

10. The authentication routing method for a cloud computing service according to claim 6, further comprising:
- returning, by the authentication server, an authentication result to the authentication router after the authentication server completes the authentication for the user terminal;
- returning, by the authentication router, an authentication result to the cloud computing service; and
- determining, by the cloud computing service, whether to provide the user terminal with the cloud computing service according to the authentication result received.

11. An authentication router, comprising:
- a registration module, which is configured to register a cloud computing service and save registration information of a cloud computing service registered successfully;
- an authentication routing module, which is configured to receive an authentication request for a user terminal from the cloud computing service, and route the authentication request for the user terminal to a corresponding authentication server for authentication according to the saved registration information corresponding to the cloud computing service; and
- wherein the registration information comprises: an index number of a cloud computing service, an authentication mechanism chosen by the cloud computing service, an address of an authentication server address providing the authentication mechanism and a routing strategy of the authentication server.

12. The authentication router according to claim 11, wherein the registration module is further configured to receive a registration request from the cloud computing service, provide an optional authentication mechanism list to the cloud computing service which is requested to be registered, and receive an authentication mechanism chosen by the cloud computing service from the list, and save the registration information of the cloud computing service according to the authentication mechanism chosen by the cloud computing service.

13. The authentication router according to claim 11, wherein the authentication request for the user terminal from the cloud computing service at least carries the index number of the cloud computing service; and
- correspondingly, the authentication routing module is further configured to choose an authentication mechanism for the cloud computing service according to a predetermined strategy and the index number of the cloud computing service carried in the authentication request, and search for a corresponding authentication server address in the registration information according to the chosen authentication mechanism to route the authentication request to the corresponding authentication server.

14. The authentication router according to claim 13, wherein the authentication routing module is further configured to choose another authentication mechanism for the cloud computing service according to the predetermined strategy when the authentication server notifies that the user terminal does not support the chosen authentication mechanism, and search for a corresponding authentication server address in the registration information according to the chosen authentication mechanism to route the authentication request to the corresponding authentication server for authentication.

15. The authentication router according to claim 11, wherein the authentication routing module is further configured to forward an authentication result returned by the authentication server to the cloud computing service after the authentication server completes the authentication for the user terminal.

* * * * *